United States Patent [19]

Thatte

[11] Patent Number: 4,814,971

[45] Date of Patent: Mar. 21, 1989

[54] VIRTUAL MEMORY RECOVERY SYSTEM USING PERSISTENT ROOTS FOR SELECTIVE GARBAGE COLLECTION AND SIBLING PAGE TIMESTAMPING FOR DEFINING CHECKPOINT STATE

[75] Inventor: Satish M. Thatte, Richardson, Tex.

[73] Assignee: Texas Instruments Incorporated, Dallas, Tex.

[21] Appl. No.: 774,828

[22] Filed: Sep. 11, 1985

[51] Int. Cl.[4] ............. G06F 11/08; G06F 11/16
[52] U.S. Cl. ................................. 364/200; 371/12
[58] Field of Search ... 364/200 MS File, 900 MS File, 364/200, 900; 371/12

[56] References Cited

U.S. PATENT DOCUMENTS

| | | | |
|---|---|---|---|
| 3,465,300 | 9/1969 | Maddox et al. | 364/200 |
| 3,736,566 | 5/1973 | Anderson | 364/200 |
| 4,020,466 | 4/1977 | Cordi et al. | 364/200 |
| 4,044,337 | 8/1977 | Hicks et al. | 364/200 |
| 4,084,231 | 4/1978 | Cappozzi et al. | 364/200 |
| 4,459,658 | 7/1984 | Gabbe et al. | 364/200 |
| 4,498,145 | 2/1985 | Baker et al. | 364/900 |
| 4,507,751 | 3/1985 | Gawlick et al. | 364/900 |
| 4,525,800 | 6/1985 | Hamerla | 364/900 |
| 4,530,054 | 7/1985 | Hamstra et al. | 364/200 |
| 4,638,426 | 1/1987 | Chang et al. | 364/200 |
| 4,648,031 | 3/1987 | Jenner | 364/200 |

OTHER PUBLICATIONS

"Physical Integrity in a Large Segmented Database", R. A. Lorie, ACM Transactions on Database Systems, vol. 2, No. 1, Mar. 1977, pp. 91-104.
"Recovery Techniques for Database Systems", J. Verhofstad, ACM Computing Surveys, vol. 10, No. 2, Jan. 1978, pp. 165-195.

Primary Examiner—Archie E. Williams, Jr.
Assistant Examiner—Leo Li Wang
Attorney, Agent, or Firm—Thomas G. Devine; James T. Comfort; Melvin Sharp

[57] ABSTRACT

Periodic checkpoints are taken of the state of a computer system and its virtual memory. If a system crash occurs, the machine state can be rolled back to the checkpoint state and normal operation restarted. Pages of virtual memory are timestamped to indicate whether they are included in the checkpoint state. Modifications made after the checkpoint time are discarded when the system state is rolled back to the saved checkpoint state. Some recordkeeping is maintained outside of the virtual memory address space in order to assist with the recovery process.

4 Claims, 5 Drawing Sheets

VIRTUAL MEMORY RECOVERY SYSTEM USING PERSISTENT ROOTS FOR SELECTIVE GARBAGE COLLECTION AND SIBLING PAGE TIMESTAMPING FOR DEFINING CHECKPOINT STATE

This application is related to copending U.S. patent application UNIFORM MEMORY SYSTEM FOR SYMBOLIC COMPUTING, filed concurrently herewith, application Ser. No. 159,467, titled Uniform Memory System for Symbolic Computing filed Feb. 19, 1986, assigned to the assignee hereof, the whole of which is hereby incorporated by reference herein, and to U.S. application titled Recoverable Virtual Memory Having Resilient Objects, filed concurrently herewith, application Ser. No. 774,827, titled Recoverable Virtual Memory, filed on Sept. 11, 1985, assigned to the assignee hereof, the whole of which is also incorporated by reference herein.

BACKGROUND OF THE INVENTION

This invention relates to digital computer systems, and specifically to a virtual memory having recovery capabilities.

In the future, as users of state-of-the-art symbolic computing machines develop large-scale, knowledge-based applications, they are expected to encounter major problems arising out of storage management problems in supporting large and complex knowledge/data bases. The word storage is used in a broad sense to encompass virtual memory, file systems and databases. The problems can be primarily attributed to the dichotomy by which today's computers, including state-of-the-art symbolic computers such as the Texas Instruments Explorer and the Symbolics 3670, manage storage along two entirely different organizations. These organizations can be referred to as the computational storage and the long-term storage.

In symbolic/artificial intelligence (AI) processing, a representation of knowledge is a combination of data structures and interpretive procedures that, if used in the right way in a program, will lead to "knowledgeable" behavior. The goals of AI systems can be described in terms of cognitive tasks like recognizing objects, answering questions, and manipulating robotic devices. The most important consideration in formulating a knowledge representation scheme is the eventual use of the knowledge. The actual use of the knowlege in symbolic/AI programs involves three stages: (1) acquiring more knowledge, (2) retrieving facts from the knowledge base relevant to the problem at hand, and (3) reasoning about these facts in search of solutions. A number of different knowledge representation schemes, such as state-space representation, logic, procedural representation, semantic nets, production systems, and frames, have been developed by the knowledge representation community. The choice of the knowledge representation scheme very much depends on the application requiements.

No matter which knowledge representation scheme is used, at some sufficiently low level of representation the knowledge is represented by memory objects interconnected by pointers. These objects exhibit a structure, which is defined by the interconnection graph of pointers connecting the objects. The structure of objects created and manipulated by symbolic/AI applications is usually very rich and complex. Moreover, both the information in objects, as well as the structure of objects, can undergo rapid changes.

In symbolic computing, objects representing a knowledge base are created and manipulated in the computational storage. As its name implies, the computational storage contains objects to be manipulated by the processor of a computer system. These objects can be numbers, strings, vectors, arrays, records, linked lists, instructions, procedures, etc. These objects, both small and large, are usually identified by names. The names of objects serve as convenient handles or pointers that can be passed as procedure parameters, returned as procedure results, and stored in other objects as components. The names of objects are typically implemented as their virtual addresses. Programmers create and manipulate objects by using programming languages, such as LISP and Prolog.

Typically, the computational storage is implemented as virtual memory, which consists of a hierarchy of memories: a fast, small semiconductor main memory, backed up by a slow, large disk to support paging. Objects in the computational storage are accessed very rapidly as the processor can directly access them by specifying their addresses (real or virtual), often at a speed that matches the basic processor cycle time. The information stored in these objects is also processed and manipulated very efficiently as it is stored in a format defined by the processor architecture, and can therefore be directly interpreted by the processor hardware or microcode.

Often, the information stored in the computational storage has a very rich structure; i.e., objects in the computational storage are interconnected by a rich and complex structure of pointers to match the requirements of applications at hand. The structure of these objects is often dynamic. However, objects in the computational storage do not exist beyond the life times of programs that create them. When a program terminates or a system shutdown, or crash occurs, these objects cease to exist. Therefore, they are called short-lived or transient objects. To make these objects survive beyond the life times of programs that created them, i.e., to make them long-lived or persistent, they must be moved to the other storage organization, i.e., the long-term storage.

As its name implies, the long-term storage is used to keep information for long periods of time. It is typically implemented on a disk-resident file system. The disk file system is logically different from the paging disk of the computational storage, even though the physical disk media may be shared by both. Examples of information stored in the long-term storage are files, directories, libraries, and databases. The long-term storage retains information in a reliable fashion for long periods of time. In order to store information beyond the life time of a program that creates it in the computational storage, the information needs to be first mapped into a representation expected by the long-term storage and then transferred to it for long-term retention using a file input/output (I/O) operation or a database operation.

The types of objects supported by the long-term storage are very respective (essentially files, directories, relations, etc.), and may match with the data structure requirements of many applications. The representation of information in the long-term storage is quite "flat." For example, a file may consist of a sequential stream of bits or bytes, such as ASCII characters. Files or relations usually can neither hold procedural objects nor pointers to other objects in the long-term storage. Information in these objects can neither be directly addressed nor directly processed by the processor, because its representation is not compatible with the processor architecture. The information can be processed only after it is mapped into a representation expected by the computational storage and then transferred to it for processing. The translation overhead in mapping these objects to/from a collection of files is quite substantial, too.

In addition to the time overhead for translation and mapping of objects between the computational and long-term storages, there is additional space overhead, as the information is essentially duplicated in virtual memory and the file system. There is an apparent paradox in that the computational storage, usually implemented as a virtual memory, hides the existence of the paging disk store; on the other hand, the long-term storage makes the existence of the disk explicit to the programmer. Thus, the programmer is faced with a nonuniform storage model, where differences in addressing, function, and retention characteristics between the computational and long-term storage are visible above the processor architecture level.

Programming languages, such as FORTRAN, Pascal, LISP, and Prolog, strongly reflect the dichotomy in storage organization. The specification of these languages almost invariably assumes long-term storage objects (files) to have entirely different characteristics from computational objects. As a result, these programming languages cannot directly process information in the long-term storage the way they can process information in the computational storage. This dichotomy propagates throughout the whole system and cannot be hidden from the user. It shows up in differences between names used for programming language objects and names used for files and databases.

The dichotomy also shows up in a different set of languages that has evolved to process information in the long-term storage. These languages include various so-called command languages, such as the UNIX shell language and the IBM TSO Command Language, that are responsible, among other things, for performing operations on files. The other class of languages which operate on persistent objects are various database languages, such as Square, Sequel, and Quel. These languages can define database objects, and perform queries and updates on them. Typically, such languages are often interpreted, and are restrictive and arcane in nature compared to the more familiar programming languages, which also enjoy the efficiency of compiled execution over interpreted execution.

As a consequence, the programmer must be aware of the nonuniform storage model, and must explicitly move information among storage media, based on the addressing mechanisms, functions and retention characteristics desired. Another consequence is that the nonuniform storage model is an obstacle to programming generality and modularity as it increases potential types of interfaces among programs. The hodgepodge of mode-dependent programming languages, such as command languages, programming languages, debugging languages, and editing languages, makes fast and efficient interaction with the system difficult.

The mapping between transient and persistent objects is usually done in part by the file system or the data base management system (DBMS) and in part by explicit user translation code which has to be written and included in each program. This task imposes both space and time penalties, and degrades system performance. Frequently the programmer is distracted from his task by the difficulties of understanding the mapping and managing the additional burden of coping with two disparate worlds: the programming language world and the DBMS world.

In large data-intensive progams there is usually a considerable amount of code, which has been estimated to be as high as 30% of the total, concerned with transferring data between files or a database, and the computational storage. Much space and time is wasted by code to perform translations between the transient and persistent object worlds, which has adverse performance impact. This is unsatisfactory because the effort and time required to develop and execute the translation code can be considerable, and also because the quality and reliability of the application programs may be impaired by the mapping. The storage dichotomy also gives rise to much duplication of effort in the operating system design and DBMS design.

These problems, created by the storage dichotomy, are considerably further complicated for symbolic/AI computing. Processes on current symbolic machines share a single address space; i.e., there is no per-process address space. Moreover, the address space is not segmented, but is a single, linear address space. Such a model of the computational storage allows easy, efficient and flexible sharing of objects among multiple processes. Any object can point to any other object by simply holding a pointer to that object (usually implemented as a virtual address of the object being pointed to). Arbitrarily complex structures of objects interconnected by pointers can be created and manipulated. Such powerful structuring of objects is very important for the development of the highly integrated and powerful software development environments available on these symbolic computers.

Unfortunately, current symbolic computers make a distinction between the computational and long-term storages, similar to today's conventional computers. In symbolic computers, making a single object persistent by moving it to a file system is not very meaningful; all objects that can be reached from an obejct by following all out-going pointers also need to be made persistent as a single entity, and all in-coming pointers pointing to the entity must be "properly taken care of." Such an entity, however, can be very large and moving it to a file system would be a complicated and expensive operation. Conversely, the reverse move from a file system to the computational storage would be equally as complicated and expensive.

Many current advanced programming techniques, especially as practiced in th symbolic/AI community, do not distinguish between procedures and data; procedures are just data, which are themselves active. As the body of information being dealt with grows and becomes more active, it becomes critical that the program environment, consisting of complex objects interconnected with rich pointer structures, survives for long periods of time. Mapping and moving of such rich environments into today's file system or database for long-term retention would involve substantial translation overhead, both in space and time.

Thus, there is a substantial difference between the representations of objects in the computational and long-term storages for symbolic/AI applications. The richer the structure of computational objects, the greater the difference and the bigger the effort needed to perform translation between these two representations. Emerging symbolic and AI applications will employ increasingly sophisticated and complex structures on a large number of objects on which retrievals, queries, inferences, reasoning, deductions, and computation will be performed. As can be anticipated, the overhead to map long-term objects into computational objects and vice-versa for large knowledge-intensive applications could be substantial.

The current approach taken by many researchers to facilitate knowledge-based applications is based on connecting a symbolic computer to a database machine. This approach is not based on persistent memory, as it neither addresses the storage dichotomy issues nor deals with the lifetime or interchangeability of procedure and data issues. There will be a mismatch between the data model requirements of symbolic/AI applications and the rigid data models supported by database machines. Therefore, such approach appears to be inadequate for expert database systems. These reservations are shared by other researchers in the field.

The persistent memory approach is based on a fundamentally different foundation. The literature on persistent memory dates back to 1962, when Kilburn proposed single-level storage, in which all programs and data are named in a single context. (T. Kilburn, "One Level Storage System", IRE Trans. Electronic Comput., vol. EC-11, no. 2, April, 1962) Saltzer proposed a direct-access storage architecture, where there is only a single context to bind and interpret all objects. (J. H. Salzer, "Naming and Binding of Objects", in R. Bayer et al, editors, Operating Systems, An Advanced Course, p. 99, Springer-Verlag, New York, NY, 1978.

Traiger proposed mapping databases into virtual address space. (I. L. Traiger, "Virtual Memory Management for Database Systems", ACM Operating Systems Review, pp. 26–48, October, 1982.) It seems that the simple data modeling requirements of the FORTRAN and COBOL worlds discouraged productization of these proposals because they are much more difficult to implement than the conventional virtual memory and database systems.

The MIT MULTICS system and the IBM System/38 have attempted to reduce the storage dichotomy. However, both have major shortcomings for symbolic computing; unlike LISP machines, each process has its own address space. All persistent information is in files. A file mapped into the address space of a process cannot hold a machine pointer to a file mapped in the address space of a different process. Thus, sharing of information among different processes is more difficult than with LISP machines. Furthermore, there is no automatic garbage collection, which is essential for supporting symbolic languages.

Recently, many researchers have proposed implementing persistent objects on top of a file system provided by the host operating system. Though persistent and transient objects still reside in two separate storage organizations, persistent objects can be of any general type, such as number, vector, array, record, or list, and can be manipulated with a common programming language such as ALGOL or LISP. However, there is a large overhead to access persistent objects because their pointers must be dereferenced by software, taking several machine cycles.

Systems having separate computational and long-term storage can easily recover from a power failure, hardware failure, software error, or the like, which can be considered as a group as "system crashes". After a system crash, any hardware problems are repaired. All Data and procedures which were in the virtual memory at the time of the crash are assumed to be lost, and the system is restarted by reloading the software from long-term storage and those items that have been stored in files or a DBMS are considered to be valid.

A system which implements a larger uniform memory is especialy vulnerable to system crashes. Because persistent objects are stored in the virtual memory, they can be corrupted by the crash. The recent changes in a particular persistent object may or may not be stored on the paging disk. The current value of large objects may be partially on disk, and partially in main memory. Thus, the values stored on disk cannot be used to merely reload and restart the system after a crash because the disk alone may contain a valid consistent state. Thus, if it is desired to restore a virtual memory after a crash, prior art file and DBMS systems cannot be used. It is necessary to devise some mechanism for preserving the state of the virtual memory.

SUMMARY OF THE INVENTION

Therefor, it is an object of the present invention to provide a virtual memory which can recover from system crashes caused by power failure, hardware failures and software errors. It is a further object to provide a virtual memory which can be restored to an earlier, valid state to minimize loss of work. It is another object to provide a means for taking regular checkpoints of the virtual memory to preserve valid states which can be restored. It is yet another object to provide a recoverable virtual memory which can be used to implement a uniform memory system suitable for symbolic computing.

Therefore, in order to accomplish these and other objectives, a virtual memory system has a random access memory backed up by a disk, the combination giving a very large virtual address space. In order to provide for system recovery in case of a power failure, hardware failure or software error, checkpoints are periodically taken of the state of the system. These checkpoints are marked and stored on disk. Changes made between a checkpoint and the next checkpoint are also stored and marked, but are discarded in the event of a system crash. When there is a system crash, the system is rolled back to the checkpoint state, and processing resumes in a normal manner.

This recovery scheme is especially suitable for use with a uniform memory, in which all memory objects are located in the same address space. A special object, the persistent root, indicates which objects are to be retained beyond the lifetime of the program which creates them. Deleted objects are marked as tombstoned, but are not entirely deleted until it is ascertained that no references to those objects are outstanding. Such memory system is especially suitable for use in symbolic computers.

The novel features which characterize the present invention are defined by the appended claims. The foregoing and other objects and advantages of the invention will hereinafter appear, and for purposes of illustration, but not limitation, a preferred embodiment is shown in the drawings.

DESCRIPTION OF THE PREFERRED EMBODIMENT

The present recovery system for a virtual memory will be described in the context of its implementation with a uniform memory, which will be described first. It will be apparent to those skilled in the art that the present recoverable virtual memory is especially msutable for implementing the uniform memory abstraction, which supports persistent objects. However, it can also be used to enhance conventional memory systems utilizing a virtual memory.

Figure 1:
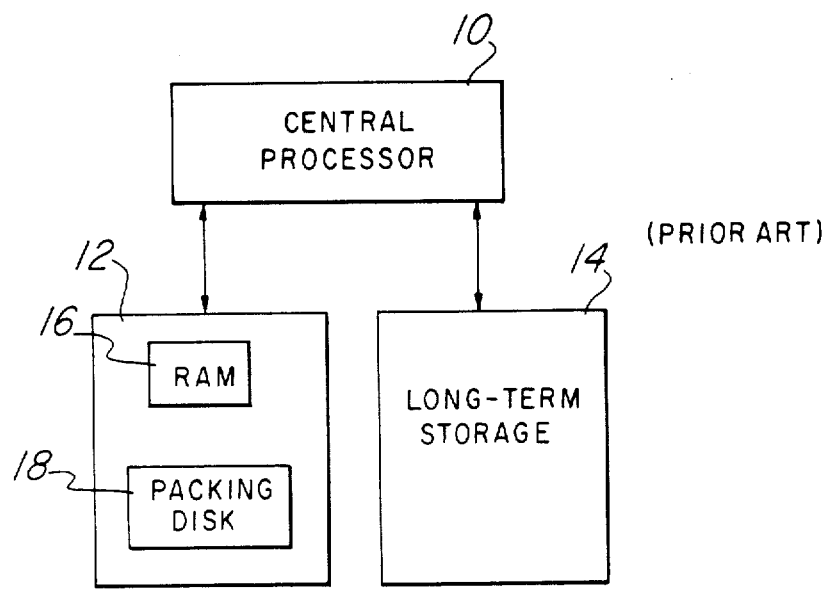
FIG. 1 is a block diagram of a prior art computer memory system architecture.

FIG. 1 shows a prior art computer architecture having separate computational and long-term storages. A central processor 10 has access to computational storage 12 and long-term storage 14. Long-term storage 14 is for retaining files, databases, etc., and is usually implemented as one or more disks backed up by magnetic tape. Computational storage 12 is a virtual memory, usually implemented as a fast semiconductor RAM memory 16 and a paging disk 18. The computational storage 12 appears to the central processor 10 as a very large RAM. Virtual memory addesses which are not actually in the semiconductor memory 16 are located on the paging disk 18 and loaded into the semiconductor memory 16 when they are referenced by the central processor 10.

Figure 2:
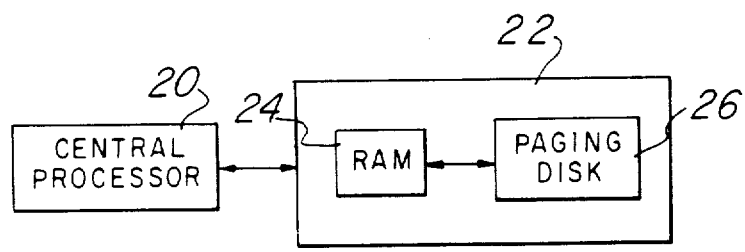
FIG. 2 is a block diagram of a computer memory architecture according to the present invention.

FIG. 2 shows a computer system having an architecture according to the present invention. A central processor 20 (CPU) has access only to a single, uniform memory 22. The memory 22 preferably consists of a very large virtual memory, having semiconductor RAM 24 backed up by a paging disk 26. The CPU 20 may be an existing system, such as an EXPLORER symbolic processor from Texas Instruments. The virtual memory 22 appears to the CPU 20 as a uniform, or single-level, memory store with a linear address space.

The uniform memory abstraction defines the storage system architecture necessary to implement a persistent memory according to the present invention. The persistent memory system is based on the uniform memory abstraction, in which a processor views memory as a set of variable-sized blocks, or objects, of memory interconnected by pointers. The memory system has a very large address space to support large knowledge-based applications. The persistent memory system is expected to store persistent objects, including "files," which could be very large in number and size. Therefore, the size of the underlying address space should be sufficiently large to support a practical system. However, the concept of persistent memory does not depend on the actual size of the address space.

As previously explained, all processes within a symbolic computer share the same single, linear address space. This allows a rich, complex structure of objects interrelated by pointers, to be created and manipulated. The structure of memory objects interconnected by pointers forms a graph. Pointers interconnecting memory objects are implemented as virtual addresses of the target objects.

Figure 3:
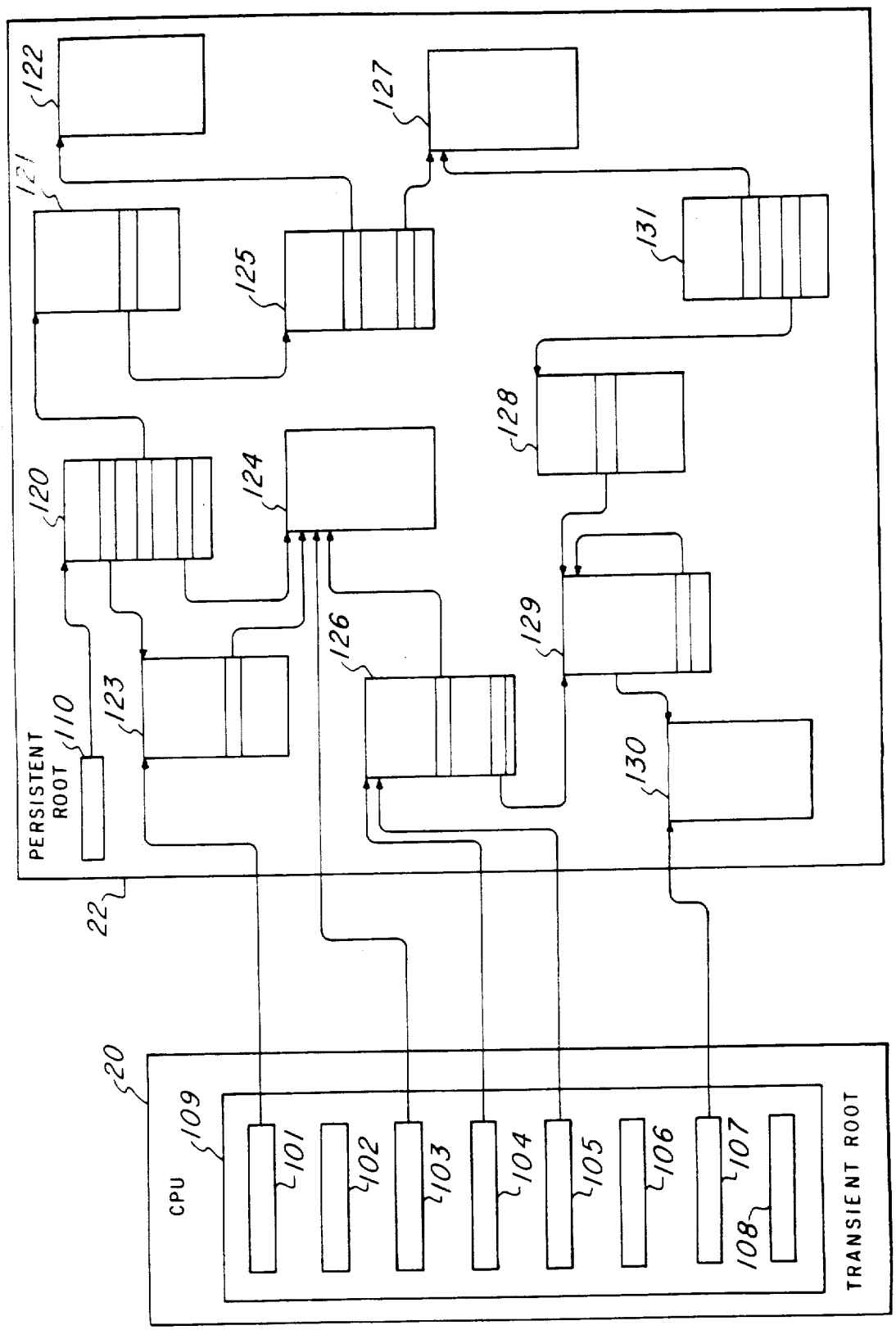
FIG. 3 is a block diagram of a uniform, persistent memory according to the present invention.

As shown in FIG. 3, there is a distinguished object in the uniform memory abstraction, called the persistent root 110, which defines persistent objects.

The persistent root 110 is a distinguished object located at a fixed virtual address and disk location. All objects that are in the transitive closure of the persistent root, i.e., reachable from the persistent root by following pointers, are persistent. The persistent root survives system shutdowns or crashes. Typically, the persistent root may contain a pointer to a table that points to other tables or structures of persistent objects and so on. Thus, the persistent root anchors all persistent objects.

The persistence attribute of an object depends solely on whether that object can be prevented from being garbage collected even after the program that created it has terminated; this can be easily arranged by making that object a member of the set of objects in the transitive closure of the persistent root. Persistence based solely on the persistent root rather than the properties of the storage medium allows a complete separation of the persistence attribute of an object from its type or relationship with other objects. Numbers, characters, lists, procedures, environments, etc., can be persistent objects while they exist in virtual memory.

Therefore, an invocation of a procedure as a persistent object is as easy and efficient as its invocation as a transient object. In fact, from the machine point of view, transient and persistent objects are indistinguishable. From the upper point of view, there is no need to treat transient and persistent objects differently; all the user needs to know is that to make an object persistent, it has to be in the transitive closure of the persistent root.

The processor contains a number of "registers." (101-108 are shown) The processor can access a memory object, i.e., read and write its individual words, if any of its registers holds a pointer to the object. The word register in this context is used in a generic sense; it may be a hardware register or a scratch-pad memory in the processor. These registers define the transient root 109 of the memory system. They do not survive a system shutdown or crash. All objects that are in the transitive closure of the transient root, but not in the transitive closure of the persistent root, are called transient. All the remaining objects are garbage and are reclaimed by a garbage collector.

FIG. 3 shows an example snapshot of the memory system and categorizes objects within it. The arrows between the objects and from CPU registers to objects represent pointers. Pointers always refer to the beginning of the object pointed to. Thus, the four pointers pointing into object 124, for example, all have the same value and point to the beginning of block 124. By determining the transient closure of the persistent root 110, and the transient root 109, it is seen that objects 126, 129 and 130 are transient; objects 120, 121, 122, 123, 124, 125, and 127 are persistent; and objects 128 and 131 are garbage.

Each memory object consists of one or more memory words, or cells, which are stored in the consecutive virtual addresses. The processor 20 can access a memory object, i.e., read and write its individual words, if any of its registers holds a pointer to the object. For example, one method of accessing individual cells is as follows. If register 101 contains a pointer to a memory object 123, then the processor 20 can read the third word of the memory object 123 by executing a READ(1, 3) instruction, where "1" specifies the processor register 101, and "3" specifies the third word of the memory object 123, pointed to by register 101. The contents of register 101 are added to "3" to develop the virtual address of the word to be read. Similarly, the processor 20 can write data in the fourth word of the memory object 123 by executing a WRITE(1, 4), data instruction. The processor 20 can access memory objects only via logical addresses; a logical address consists of a pair (i, j), where "i" is the identification number of a processor register, and "j" indicates the j-th word of an object being pointed at by processor register "i."

The notion of memory objects in the uniform memory abstraction corresponds to objects used in high-level programming languages, such as numbers, booleans, characters, strings, LISP CONS cells, arrays, records, procedures, or environments. These language-level objects can be implemented using one or more memory objects interconnected by pointers. Application-level objects are constructed by combining language-level objects.

The persistence propety of objects is based solely on whether or not an object is within the transitive closure of the persistent root 110. The persistence attribute of an object is a fundamental notion. It should depend only on whether the object can survive beyond the life time of a program that creates it. It should neither depend on the type of the object nor on the properties of the storage medium on which the object resides. Since there will usually be several sets of unrelated groups of objects which are persistant, the persistant root 110 will usually first point to an object which contains nothing more than pointers to persistent objects. Any object, transient or persistent, can point to any other object to facilitate the unrestricted sharing desired in many symbolic/AI computations.

In contrast to this mechanism of achieving persistence of objects based solely on the persistent root, in today's machines, both conventional and symbolic, an object becomes persistent only when it is stored in the long-term storage, i.e., disk store. Even in MULTICS or IBM-System/38, only certain types of objects, i.e., files, can become persistent, while other types of objects, such as procedures, cannot.

With the persistent root 110, the persistence attributes of an object solely depends on whether that object can be prevented from being garbage collected even when the program that created it has terminated; that can be easily arranged by making that object a member of the set of objects in the transitive closure of the persistent root 110.

The transience/persistence attribute of objects is not necessarily a permanent attribute. An object may be created as a transient object, then it can become a persistent object solely on the basis of being in the transitive closure of the persistent root 110, and then can revert back to the transient state by getting out of the transitive closure of persistent root 110, and so on.

Each pointer, implemented as a virtual address, is tagged as a pointer within memory. This tagging mechanism is used to ensure that the processor cannot specify, fabricate, or forge a pointer. The processor is allowed to access memory only be reference to logical memory blocks. There may be additional tagging information associated with each object to indicate its type, such as integer, floating point number, string, array, list, or closure. This tagging information is used to ensure that attempts to perform operations that are undefined or illegal on a particular object type cause traps to appropriate exception handling routines; for example, an attempt to add an integer to a string object would cause an exception. Each memory reference can be checked for bounds, i.e., "j" in a logical address (i, j) should not exceed the size of the object pointed to by processor register "i."

The nature of the memory system requires that it be garbage collected and be free from the so-called dangling reference problem. Garbage collection is essential to be able to make computational progress in a finite amount of memory space. Without the reclamation and resuse of memory space occupied by an object proven to be garbage (i.e., no outstanding pointers to the object from non-garbage objects), the system would eventually come to a grinding halt as it ran out of memory. Garbage collection is preferably done automatically in real time, and preferably as a process executing concurrently with user processes. This is not necessary to the invention, however, and garbage collection can occur during periods of machine non-use, such as overnight.

The dangling reference problem arises if the memory space for an explicitly deleted object is reclaimed without proving that there are no outstanding pointers to that object. If the space occupied by a deleted object is reclaimed prior to such a proof, then the outstanding pointers to the object may point to empty space, i.e., unallocated memory, or to some undesired object if the reclaimed space has been later allocated to the new object. In either case, the memory system integrity would be violated.

The proof that there are no outstanding pointers to a deleted object is embedded within the garbage collector. A deleted object is specially marked as tombstoned when it is deleted. All of the outstanding pointers to a tombstoned block are detected by the garbage collector and then destroyed. When no pointers to a tombstoned block are left, its space is automatically reclaimed.

The notion of the integrity of the memory system refers to the integrity of the structure of the graph of memory objects interconnected by pointers. Under this notion, the integrity of the memory system is preserved because it is impossible to forge a pointer, no information outside the bounds of an object can be accessed, undefined or illegal operations for any object type cause appropriate exception handling actions, and there is no dangling reference problem. Therefore, the graph of memory objects undergoes transition only from one consistent state to another, ensuring its structural integrity.

The uniform memory abstraction achieves its goal of being able to manipulate both transient and persistent objects with equal ease, flexibility and efficiency because words of a memory object pointed to by a processor register can be accessed with equal ease and speed, independent of whether the object is transient or persistent. Therefore, an invocation of a procedure as a persistent object is as easy and efficient as its invocation as a transient object. In fact, as far as the machine is concerned, there is no distinction in processing transient and persistent objects. The uniform memory abstraction allows the same set of flexible and powerful operations on transient and persistent objects from a single programming language. New procedures can be invoked as persistent objects or transient objects. None of the prior art systems can do this; in those systems, access to persistent objects is considerably slower or more complicated then access to transient objects.

Figure 9:
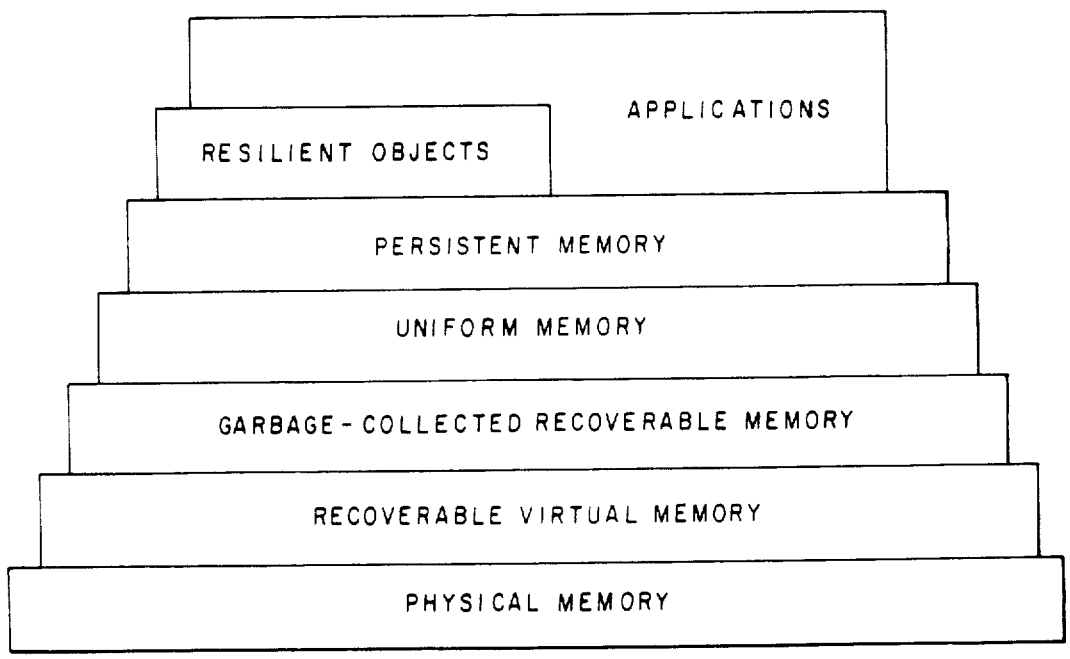
FIG. 9 illustrates a hierarchy of memory abstractions.

The relationship between the parts of the overall memory system, including the uniform and persistent memory, just described, and the recoverable virtual memory, described below, is illustrated in FIG. 9. The various levels of viewing the system are shown as a hierarchy of memory abstractions.

At the lowest level is the actual physical memory: the main semiconductor RAM memory and the paging disk. The next level of abstraction is the recoverable virtual memory as described below. The next level shows garbage collection of the virtual memory, which can be done by one of several known methods. The abstraction of uniform memory is one of several that can be implemented on top of a recoverable virtual memory. The persistent memory described above is implemented as the next layer of abstraction, and the concept of resilient objects, as described in copending U.S. application entitled Recoverable Virtual Memory Having Resilient Objects, by Thatte et al, attorney docket number 11508, filed concurrently herewith and assigned to the assignee of the present application, which application is hereby incorporated herein by reference, is implemented on the persistent memory. Finally, user applications, such as expert database systems and object-oriented databases, are implemented at the top of the hierarchy.

The recoverable virtual memory will now be described. In order to preserve the contents of the persistent memory system in the event of a system crash, a recovery capability at the level of the virtual memory itself is required. In today's machines, both conventional and symbolic, recovery capability at the level of virtual memory is not required. If there is a system crash, information in the computational storage is assumed to be lost; but information in the long-term storage survives because it resides on a non-volatile disk store, which cannot be directly accessed by the processor. Applications or users are expected to transfer information from the computational storage to the long-term storage for survival from crashes. After a system crash, the system is restarted using the information found in the long-term storage. Therefore, recovery is not a major concern in today's machines. Such a luxury has to be sacrificed in the persistent memory system, as there is no distinction between the computational and long-term storage.

Failures that are expected to be dealt with by the recovery system can be classified into two broad categories: system crashes and media failures. System crashes may be caused by power failures, or software errors or hardware failures. Software errors may arise from bugs in the application or systems software, incorrect data of commands, etc. Hardware failures account for intermittent and permanent failures in the processor, main memory, or I/O devices and their controllers. Media failures, which account for disk storage failures, have been deliberately excluded from hardware failures for reasons explained below.

A system crash can be signalled by hardware self-checking circuits, a power failure detector interrupt, or by the inability of software error handling routines to recover from a software error. Hardware self-checking circuits typically include parity error detectors on memories and buses, fire code detectors for disks, self-checking checkers, watch-dog processors, etc. It is assumed that the latency of a system crash detection, i.e., the time period between the system state corruption because of a system crash and the actual detection of the crash, is quite small so that the probability of taking a checkpoint, as described below, in this small time period is negligibly small. This assumption and its implementation is necessary for the recovery system to work; otherwise, it is quite likely that a checkpoint would be taken when the system has already reached a corrupted state.

When a system crash occurs, the present state of the entire uniform memory is assumed to be corrupted and no further computational process is possible. When a system crash is detected the diagnostics routines are run, which attempt to identify if the failure occurred due to a permanent hardware failure. If a permanent hardware failure is detected, then the faulty hardware, such as a processor board or a memory module, is replaced or repaired before any further recovery steps are taken. If no permanent hardware problem is detected, the recovery scheme rolls back the state of the entire memory system to the last checkpoint state stored on disk, as explained below. From the checkpoint state, normal computation can be resumed.

It is expected that system crashes arising from software failures will be much more common than those arising from hardware failures. The average rate of system crashes in a single-user machine is expected to be on the order of a few crashes per month, and an average recovery time of several minutes is acceptable (assuming no permanent hardware failures).

The media failures that affect disk storage can arise from disk head crashes, deterioration of the magnetic media itself, or bugs in the disk driver software. It is expected that media failures are much less frequent than system crashes. The average media failure rate may be a few failures per year, and the average recovery time after a media failure is expected to be a few hours.

The reason that media failures are treated differently from system crashes is that a media failure also corrupts the last checkpoint state on disk, and the roll-back technique used for recovery after a system crash would not work. To deal with media failures. the last checkpoint state on disk needs to be archived on another media, such as a streaming tape. After a media failure, a failed disk needs to be replaced with a new one, which is then initialized from the last archived checkpoint state.

A preferred recovery scheme for recovering from system crashes, as defined above, will now be described. The recovery scheme is based on a novel mechanism to take periodic checkpoints of the entire machine state in an efficient fashion, possibly initiated by the user or an application program. The checkpointing scheme keeps the entire machine state valid, within the last few minutes, on disk.

The preferred embodiment utilizes a paged virtual memory. Memory is paged to and from the paging disk in blocks of predetermined site, for example 2K words, regardless of the size of memory objects 120–131. Thus, several small objects may reside on a single page, and large objects may extend over multiple pages.

When a new virtual page is materialized at the request of the memory allocator, it is placed in a properly initialized main memory 24, and is simultaneously materialized on the paging disk 26. As explained below, a virtual page is materialized on disk in either the sibling form or the singleton form. In the sibling form, two adjacent disk blocks are allocated to a virtual page; in the singleton form, a single disk block is allocated. If the page is unlikely to be modified in the future (for example, a page containing instructions), it is materialized in the singleton form to save disk space. If it is expected to contain data, it is materialized in the sibling form.

Figure 4:
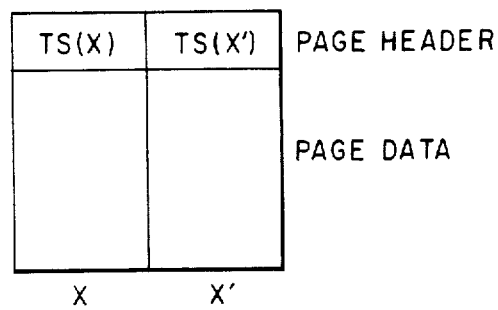
FIG. 4 is a representation of sibling virtual pages as stored on a paging disk.

As shown in FIG. 4, the two adjacent disk blocks allocated for a virtual page in the sibling form are called siblings. The sibling pages are referred to as x and x'. A singleton page is denoted as s.

When a page is written to the paging disk 26, it is stamped with the time of the disk write operation. In FIG. 4, TS(x) indicates the timestamp of x and TS(x') indicates the timestamp of x'. TS(s) denotes the timestamp of singleton s. A convenient place to record the timestamp is the page header. Timestamps written in headers will survive system crashes because they are stored on disk. Timestands are derived from a timer that runs reliably even in the presence of system shutdowns and crashes. The granularity of timestamps need only be moderately smaller than the time for a disk write operation because pages cannot be written faster than the disk write speed. With a 10 milliseconds granularity, a 64 bit timer can generate unique timestamps for 5.8 billion years. Therefor, a 64-bit timestamp field in page headers is more than adequate.

As shown in FIG. 4, the page header is contiguous to the page data on disk. As a page is fetched from the paging disk 26 into main memory 24, the header information is scattered to some other predetermined page in main memory 24. When the page is written to disk, its header information is gathered together with the data. To perform this operation efficiently, the disk controller should have the scatter-gather capability. The scatter-gather capability is necessary only for performance and not for the correct functionality of the recoverable virtual memory.

When a page is materialized in sibling form, its siblings are materialized on disk with timestamps of $-1$ and $-2$, indicating that both are yet to be written. Alternate schemes for timestamp initialization are of course possible. When a page is materialized in singleton form, it is initialized on disk with a time stamp of $-1$. All disk blocks that have been modified since their initial materialization on disk will have unique timestamps.

The time of the last checkpoint operation is denoted as $T_{chk}$. It is stored in a reliable fashion at a known disk location. Updating of $T_{chk}$ must be reliable; any errors made in updating $T_{chk}$ will probably destroy the checkpoint scheme. One method for ensuring the integrity of the value $T_{chk}$ is to keep two identical copies on two different disk blocks. When $T_{chk}$ is to be updated, the first copy is changed, and immediately read back ensure a proper update. A system crash during this operation would not effect the second copy, so that the original value of $T_{chk}$ is preserved. After the first copy is indicated and verified, the second copy is updated and verified. A system crash during this operation will not effect the system integrity, as the proper new value of $T_{chk}$ is in the first copy. Thus, one is assured of a proper value for $T_{chk}$ at all times.

A checkpoint state is "pristine" in the sense that it cannot be accessed during normal operation, and remains unperturbed unless there is a media crash. A singleton page with a timestamp smaller, or earlier, than $T_{chk}$ belongs to the checkpoint state; on the other hand, a singleton page with a timestamp larger, or later, than $T_{chk}$, is outside the checkpoint state. For sibling pages, if $TS(x)<TS(x')<T_{chk}$, i.e., if both siblings have timestamps smaller than $T_{chk}$, then the sibling with the larger timestamp, here x', belongs to the checkpoint state, and the other sibling, here x, contains outdated information. If one sibling has a timestamp smaller than $T_{chk}$ and the other sibling has a larger timestamp, the sibling with the smaller timestamp belongs to the checkpoint state and the sibling with the larger timestamp is outside the checkpoint state. Because of the way that timestamps are initialized and updated, both siblings cannot have a timestamp larger than $T_{chk}$. The timestamp is the only mechanism to distinguish between pages that belong to the last checkpoint state and pages that do not.

On a page fault, if the missing page is in the sibling form, both sibling pages are read in a single disk access to reduce the access time. This is possible because they are located adjacent to each other on disk. It is expected that the time to fetch two adjacent disk pages in only marginally larger than the time to fetch a single page. For the TI EXPLORER LISP machine, the average time to fetch both adjacent pages is expected to be approximately 2% of the time to fetch a single page.

Figure 5:
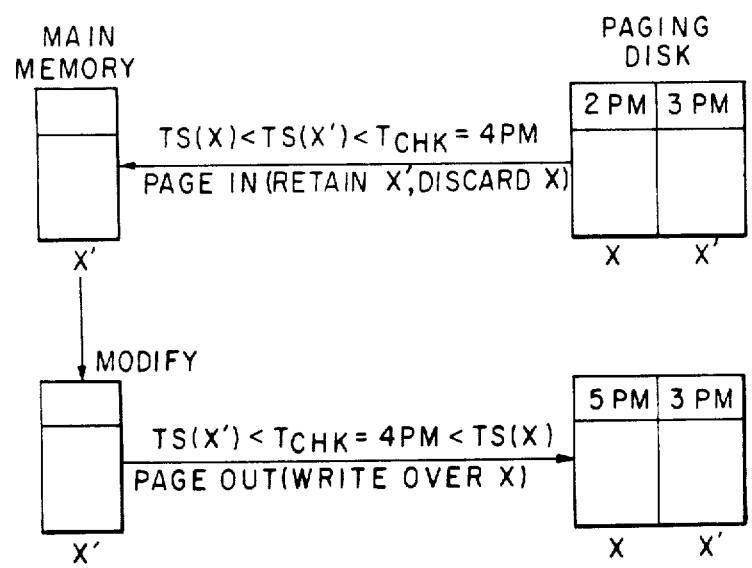
FIG. 5 illustrates how some sibling pages are updated.

If $TS(x)<TS(x')<T_{chk}$, i.e., if both siblings have timestamps smaller than $T_{chk}$, then the sibling with the larger timestamp, i.e., x', is kept in main memory, and the other sibling, i.e., x, is discarded. The situation is analogous for $TS(x')<TS(x)<T_{chk}$. The sibling kept belongs to the checkpoint state, while the discarded sibling contains useless information. When this page is later written to disk, it is written over the disk space of the discarded sibling x; it cannot be written over the disk space of x', else the checkpoint state would be destroyed. After writing to disk, the timestamp relationship becomes $TS(x')<T_{chk}<TS(x)$. This operation is illustated in FIG. 5, which assumes the most recent checkpoint was taken at 4 p.m. x', with timestamp$=3$ pm, is kept in main memory. This sibling, as modified, is written back to disk at 5 pm over the disk space of x.

Figure 6:
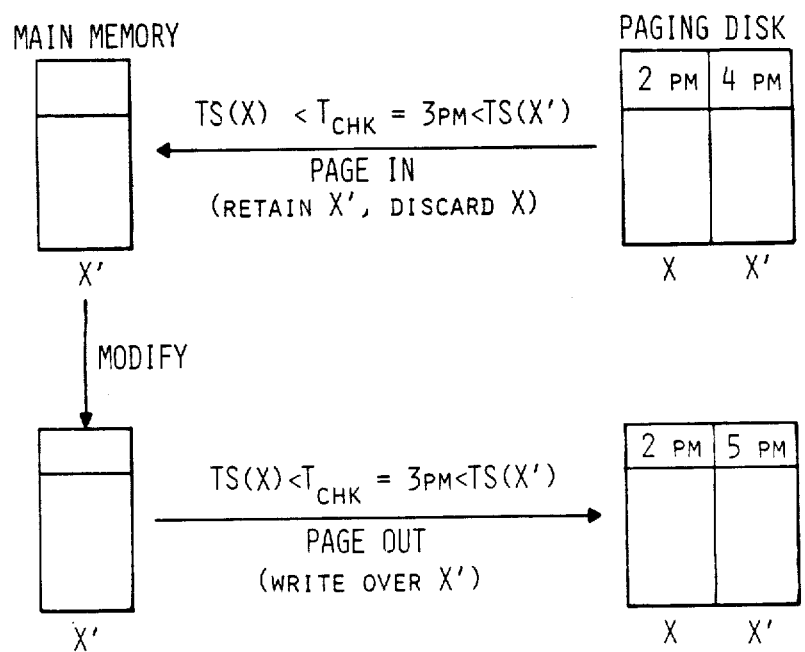
FIG. 6 illustrates how other sibling pages are updated.

If $TS(x)<T_{chk}<TS(x')$, i.e., $T_{chk}$ falls between the timestamps of two siblings, the sibling with the larger timestamp, i.e., x', is kept in main memory, and the other sibling, i.e., x, is discarded from main memory. The situation is analogous for $TS(x')<TS(x)<T_{chk}$. This case is illustrated in FIG. 6. The difference between FIG. 5 and FIG. 6 lies in the space on disk where the page is written back. The page is written over its own disk space in FIG. 6, i.e., over x', because x' is not part of the last checkpoint state and can be written over, while x belongs to the checkpoint state and must be preserved. On the other hand, in FIG. 5, x' is written over the disk space of the other sibling, i.e., over x, for the reasons explained above. When the page is modified and written to disk, the timestamp relation is unchanged.

Figure 7:
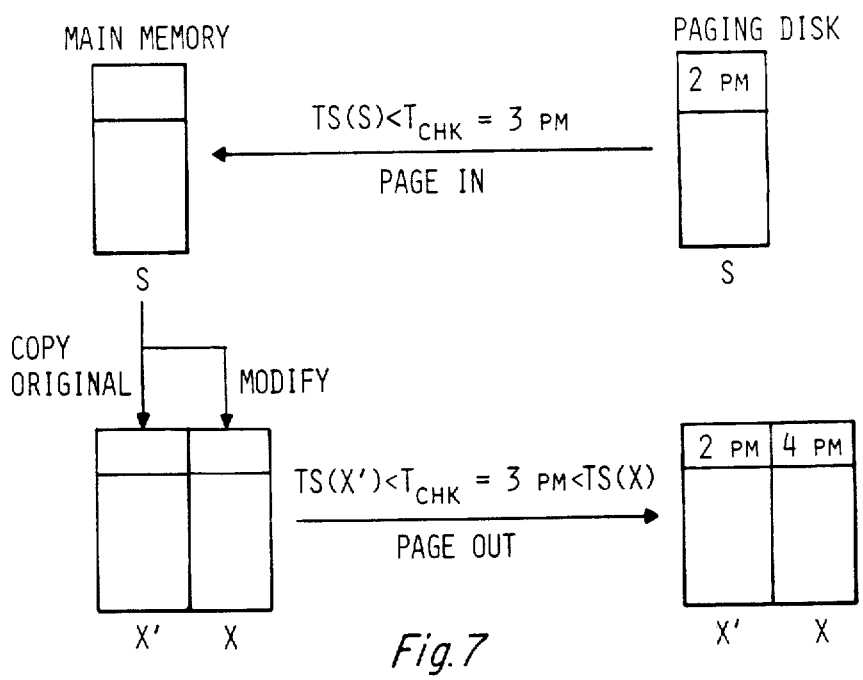
FIG. 7 illustrates how singleton pages are updated.

For a singleton page, if $TS(s)<T_{chk}$, i.e., its timestamp is smaller than $T_{chk}$, then it must be converted to a sibling form when it is modified, as shown in FIG. 7. This conversion is necessary because the checkpointed state must not be overwritten. After the conversion, the timestamp relationship becomes $TS(x')<T_{chk}<TS(x)$. When a singleton is converted to a sibling, it is copied to, say x', while its modified version is written over x. On the other hand, if the timestamp of a singleton page is larger than $T_{chk}$, then its conversion to a sibling is not required because it is not a part of the checkpoint state.

Thus, each virtual page on disk is stored in either of the two different forms: sibling or singleton, depending on whether the virtual page is update-active or update-inactive, respectively. As these names suggest, virtual pages that have been recently updated are termed update-active, and those that have not been recently updated are termed update-inactive.

To reduce the disk space requirement, a sibling page is converted back to the singleton form when both siblings remain update-inactive for a long period, defined by a threshold parameter in the system. If $TS(x) < TS(x') < T_{chk}$ and $T_{chk} - TS(x') >$ (threshold) or $TS(x') < TS(x) < T_{chk}$ and $T_{chk} - TS(x) >$ (threshold), then the disk space manager reclaims their space by converting them into a singleton form. Singleton s contains the original contents and timestamp of the more recent sibling.

Generally, pages in sibling form and singleton form will be stored in different location on disk in order to optimize disk usage. A page table within the virtual memory address space indicates the disk location of each allocated virtual page. The page table is a persistent object, and is checkpointed as are all other objects. When a sibling is converted to a singleton, or vice versa, the page table is updated to point to the new disk location for that page, and the old location is deallocated and more available for later use.

If there is a system crash, when the page table is restored it will point to the old disk location of the converted page. This old location may now contain unrelated information, as it may have been reallocated by the disk manager. Thus, it is necessary to keep a Forward-Page log (FP-log) outside of the virtual memory address space.

Whenever a sibling is converted to a singleton, and vice versa, an entry is written to the FP-log. This entry identifies the virtual page, and shows the old (before conversion) and new (after conversion) disk addresses. The FP-log allows the correct disk location of pages which have been converted to be recalculated after a system crash, even though the information in the page table portion of the checkpoint state is incorrect. Processing of the FP-log will be discussed further in connection with FIG. 8.

Whenever a sibling or singleton is modified, a sibling is written back to disk at a time after the last checkpoint. If there is indeed a system crash, that sibling must be expunged from the machine state by demoting its timestamp to a large negative number during the post-crash recovery. When its timestamp is denoted to a large negative number, the sibling is effectively rendered useless, and would be discarded if paged in during normal operation resumed after the post-crash recovery. If the timestamp were not demoted, the sibling would be retained in main memory, if paged in, and the roll back process would fail to recreate the checkpoint state.

Siblings whose timestamps must be demoted during the post-crash recovery can be located using a log, called the Expunge log. The Expunge log keeps track of a page which is written out to disk for the first time, if and only if, the page is part of the last checkpoint and the page has not yet been written to disk since the last checkpoint. This occurs if $TS(x) < TS(x') < T_{chk}$ disk address, along with the time of its writing to disk, are appended to the end of the Expunge log. The Expunge log must be maintained outside the virtual memory for it must survive system crashes. This can be done by writing it onto a different disk, for exmaple, or to a specially set aside sector of the paging disk. In any event, the Expunge log is outside the virtual address spaces.

If a system crash occurs before the next checkpoint, then as part of the post-crash recovery process, the Expunge log is processed: each page recorded in the log since the last checcpoint is located on disk and the sibling with the higher timestamp is expunged by demoting its timestamp to a large negative value. By demoting its timestamp to a large negative value, the sibling is rendered useless.

Maintenance of the Expunge log requires disk accesses. This requirement can be amortized over a set of several pages. Instead of writing an entry to the Expunge log each time a page in the set is written out, a number of pages in the set can be queued up as they are on their way out to disk. Entries for all pages in the set can be first constructed and written into the Expunge log, and then all the pages can be actually written out. Alternatively, a small non-volatile random-access memory can be used to buffer entries in the Expunge log. A background process would then be responsible for emptying this buffer to disk.

The checkpoint process may be initiated by an application or the system. At checkpoint time, a checkpoint process takes over. It saves all processor registers, ie., the transient root, into a snapshot object, which is part of the virtual memory. The snapshot object resides at a fixed and known disk location, and is in the transitive closure of the persistent root. All dirty pages in the main memory are then written to disk. Finally $T_{chk}$ is updated on disk to the current time, completing the checkpoint process. As described earlier, $T_{chk}$ may either be successfully updated, or the old value retained. Immediately after the checkpoint operation, $TS(x)$ and $TS(x')$ must both be less than $T_{chk}$ for all sibling pages, and $TS(s)$ must be less than $T_{chk}$ for all singleton pages. Also, all previously transient objects now become persistent, as they are now members of the transitive closure of the persistent root by virtue of the transient root becoming a persistent object.

It is highly desirable to reduce the time required to complete the checkpoint operation. The major part of the checkpoint operation is the cleaning up of dirty modified pages since the last checkpoint in main memory by writing them to disk. This time must be reduced so that there is no user-perceived pause attributed to the checkpointing process. Such pauses would be irritating for interactive users and disruptive for time-critical applications such as graphics and animation.

The time for checkpointing can be reduced by means of two techniques. The first is by making sure that the fraction of dirty pages in main memory at the checkpoint time is reasonably small by continuously cleaning up the dirty pages between successive checkpoints. This can be done by a continuously operating background process. A good heuristic to select a dirty page for cleaning up is "select a dirty page that has not been modified recently". The second is by cleaning up the dirty pages at the checkpointing time with no user-perceived pause, as explained below.

A further reduction of the perceived time used to take a checkpoint can be made by utilizing a copy-on-write technique to clean up dirty pages in main memory. Using this technique, all dirty pages in main memory are marked as copy-on-write; any attempt to write to them will cause a trap as explained below. This marking would generally be done in a page table, a data structure in the virtual memory for keeping track of the location of virtual memory pages. The processor registers are then restored from the snapshot object and the normal operation resumes. All these operations involve only one disk operation to store the processor registers into the snapshot object on disk. Therefore, all these operations can be completed in well below 100 milliseconds on a typical winchester disk system, allowing the resumption of normal operation without any user-perceived pause.

The copy-on-write mechanism allows a very rapid resumption of the normal operation as no time is spent in writing the dirty pages back to disk before the normal operation resumes. After normal operation resumes, any attempt by the processor to modify the pages marked as copy-on-write causes a trap. The trap handler first makes a copy of the page in main memory and this new copy is modified, but the original copy is not disturbed as it belongs to the checkpointed state. Any further attempts to modify are directed to this new copy. Until all pages marked as copy-on-write are cleaned up by writing them to disk, no newly created dirty pages are cleaned up. While the copy-on-write pages are being cleaned up, the normal operation continues. Cleaning up of dirty pages is preferably accomplished by a system routine running concurrently with user processes. Only when all pages marked as copy-on-write are cleaned up is the $T_{chk}$ variable updated to be the current time, signalling the completion of a checkpointing operation. Note that at the end of a checkpointing operation, the entire machine state is stored on disk.

Figure 8:
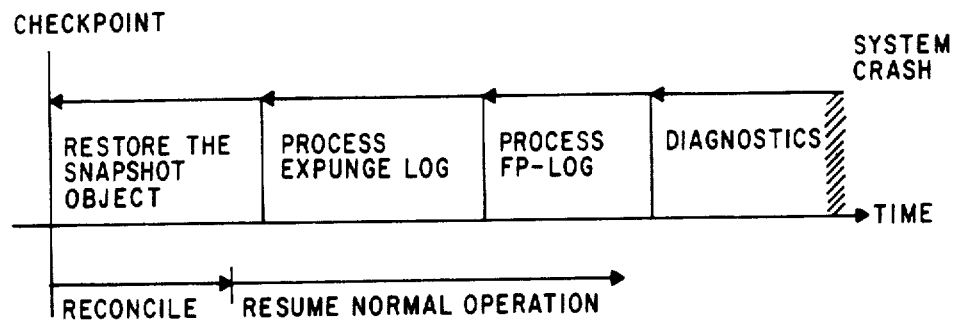
FIG. 8 illustrates the process of recovering from a system crash.

FIG. 8 indicates the activities during a post-crash recovery. After a system crash, diagnostics are run to detect any permanent hardware failures. If the diagnositics effort does not indicate a permanent hardware failure, or after any indicated failure is repaired, the FP-log is processed. This involves reading each entry in the FP-log, and using the new disk location contained therein to update the page table as stored in the checkpoint state. Next, each page indicated by the Expunge log is located on disk, and the sibling with the higher timestamp is expunged by demoting its timestamp to a large negative value as explained above. Then the state of the machine is rolled back to the state corresponding to the last checkpoint by restoring the processor registers from the snapshot object.

The system must be reconciled with the external world prior to restart. Part of the restored checkpoint state is related to the system configuration and I/O interfaces specific to the checkpoint time. This state must now be reconciled with the current time and configuration. For example, if the checkpoint state contains a timer variable, this variable must be adjusted to reflect the current time. At this point the normal operation from the checkpoint state can be resumed.

The problem of media or disk failures, as described earlier, can be addressed by archiving the last checkpointed state on disk to some other storage medium such as a streaming tape. This process is called the checkpoint archival process. If a disk failure occurs, a new disk can replace the damaged one, and the archieved state can be used to initialized the new disk. Only those pages of the last checkpointed state that are dirty with respect to the last archived state need be copied to the archival medium. Pages that are dirty with respect to the last archieved state indicate same with a flage in the pageheader. This flag can also be maintained in the page table. The next checkpoint cannot be taken until an ongoing checkpoint archival process, if any, is completed. The checkpoint archival process is a relatively infrequent operation and is expected to occur at most a few times a week, perhaps as an overnight operation, or when no user is working on the machine.

Although a preferred embodiment has been described in detail, it is understood that various substitutions, additions and modification may become apparent to those skilled in the art. These changes may be made without departing from the spirit and scope of the invention, which is defined by the appended claims.

What is claimed is:

1. A computer system having a recoverable virtual memory, comprising:
    a virtual memory having a random access memory and a non-volatile mass storage system, said virtual memory defining a virtual address space having a plurality of memory locations;
    a plurality of memory objects allocated within said virtual address space, said memory objects interconnected by pointers;
    a persistent root having a pointer to a memory object, wherein all memory objects in the transitive closure of said persistent root are not subject to reclamation by the computer system during garbage collection;
    a plurality of virtual pages stored on the mass storage system, each of said virtual pages having a timestamp, each of said pages corresponding to a selected range of addresses within said address space and containing memory objects for such range, wherein a first subset of said virtual pages have an associated sibling page which contains a copy of memory objects of the addresses in the selected range, with each of the sibling pages having a timestamp, wherein a virtual page and its sibling page may have different data stored therein if they have different timestamps, with the virtual page of the sibling having the later timestamp containing the current memory objects for the selected range of addresses, and wherein a second subset of said virtual pages have no associated sibling
    a checkpoint time stored in a non-destructive manner, wherein virtual pages and sibling pages which have a timestamp less than said checkpoint time define a checkpoint state;
    means for moving virtual pages from said first subset to said second subset by deleting the associated sibling page, and for moving virtual pages from said second subset to said first subset by creating a sibling page therefor; and
    a record of which of said virtual pages have moved from the first subset to the second subset, and from the second subset to the first subset, since the checkpoint time.

2. The computer system of claim 1, further including a record of which of said virtual pages and siblings have been written to the mass storage system since the checkpoint state.

3. The computer system of claim 2, wherein said record does not have an address within the address space of said virtual memory.

4. The computer system of claim 1, wherein said record does not have an address within the address space of said virtual memory.

* * * * *